(12) United States Patent
Hartl (10) Patent No.: US 11,521,196 B2
(45) Date of Patent: Dec. 6, 2022

(54) SYSTEM FOR CASHLESS PAYMENT OF PRODUCTS OR SERVICES

(71) Applicant: Walter Hanke—Mechanische Werkstätten GmbH & Co. KG, Berlin (DE)

(72) Inventor: Uwe Hartl, Potsdam (DE)

(73) Assignee: Walter Hanke—Mechanische Werkstätten GmbH & Co. KG, Berlin (DE)

( * ) Notice: Subject to any disclaimer, the term of this patent is extended or adjusted under 35 U.S.C. 154(b) by 327 days.

(21) Appl. No.: 15/379,902

(22) Filed: Dec. 15, 2016

(65) Prior Publication Data

US 2017/0185994 A1    Jun. 29, 2017

Related U.S. Application Data

(60) Provisional application No. 62/267,438, filed on Dec. 15, 2015.

(51) Int. Cl.
    *G06Q 20/32* (2012.01)
    *G07F 9/02* (2006.01)
    (Continued)

(52) U.S. Cl.
    CPC ......... *G06Q 20/3278* (2013.01); *G06Q 20/18* (2013.01); *G06Q 20/202* (2013.01);
    (Continued)

(58) Field of Classification Search
    CPC .... G06Q 20/322; G06Q 20/00; G06Q 20/327; G06Q 20/3278; G06Q 20/202;
    (Continued)

(56) References Cited

U.S. PATENT DOCUMENTS

| 6,772,048 B1* | 8/2004 | Leibu | G07F 9/08 |
| | | | 221/131 |
| 6,844,813 B2* | 1/2005 | Hardman | G07F 5/18 |
| | | | 340/539.1 |

(Continued)

FOREIGN PATENT DOCUMENTS

| WO | 20150164366 A1 | 10/2015 |
| WO | 2015/186141 A1 | 12/2015 |
| WO | 20150186141 A1 | 12/2015 |

OTHER PUBLICATIONS https://www.vendingmarketwatch.com/home/article/10273789/the-emerging-methods-of-dex-data-collection (Year: 2005).*

(Continued)

*Primary Examiner* — Ariel J Yu
*Assistant Examiner* — Dana Amsdell
(74) *Attorney, Agent, or Firm* — Adams and Reese LLP; Ray R. Ferrera (57) ABSTRACT

A system for cashless payment of goods or services is provided which includes at least one payment unit disposed in at least one automat or machine, having at least one transmitting/receiving unit for short range communication; a processing unit; and a memory, wherein the automat or machine is connected to one or more other automats or machines via a short range communication means, at least one mobile device also having a transmitting/receiving device for both short range communication and long range communication, a processing unit and a memory. Many other detailed configurations, functionalities, systems, processes and alternatives thereto are also disclosed.

14 Claims, 3 Drawing Sheets

(51) Int. Cl.
*G06Q 20/20* (2012.01)
*G07F 9/00* (2006.01)
*G06Q 40/00* (2012.01)
*G06Q 20/36* (2012.01)
*H04W 4/80* (2018.01)
*G06Q 20/18* (2012.01)
*H04W 88/02* (2009.01)

(52) U.S. Cl.
CPC ........... *G06Q 20/327* (2013.01); *G06Q 20/36* (2013.01); *G07F 9/02* (2013.01); *H04W 4/80* (2018.02); *H04W 88/02* (2013.01)

(58) Field of Classification Search
CPC .. G06Q 20/405; G06Q 30/0237; G06Q 20/20; G06Q 20/26; G07F 11/002; H04W 84/12; H04W 88/06; H04W 36/03; H04W 4/06; H04W 8/005; G07G 1/0036; G07G 1/14
See application file for complete search history.

(56) References Cited

U.S. PATENT DOCUMENTS

| | | | | |
|---|---|---|---|---|
| 6,934,689 B1* | 8/2005 | Ritter | .................... | G06Q 20/04 705/16 |
| 7,865,431 B2* | 1/2011 | Takayama | .............. | G06Q 20/00 705/35 |
| 8,181,867 B1* | 5/2012 | Bierbaum | ............ | G06Q 20/405 235/384 |
| 8,856,045 B1* | 10/2014 | Patel | .................. | G06Q 20/3829 705/79 |
| 9,256,873 B2* | 2/2016 | Patel | .................. | G06Q 20/3823 |
| 9,830,764 B1* | 11/2017 | Murphy | ................ | G07F 11/002 |
| 10,019,724 B2* | 7/2018 | Patel | .................. | G06Q 30/0267 |
| 10,049,349 B1* | 8/2018 | Grassadonia | .......... | G06Q 20/40 |
| 2001/0054083 A1 | 12/2001 | Defosse | | |
| 2002/0128932 A1* | 9/2002 | Yung | ....................... | G07F 9/026 705/28 |
| 2003/0051080 A1* | 3/2003 | Mahany | ................ | H04L 1/0003 710/18 |
| 2003/0078049 A1* | 4/2003 | Klank | ................ | H04W 72/085 455/450 |
| 2003/0169180 A1* | 9/2003 | Hardman | .................. | G07F 5/18 340/870.01 |
| 2004/0103063 A1* | 5/2004 | Takayama | .............. | G06Q 20/00 705/41 |
| 2005/0186908 A1* | 8/2005 | Shin | ....................... | H04W 36/03 455/41.2 |
| 2006/0096997 A1* | 5/2006 | Yeo | ........................ | G07F 9/001 221/9 |
| 2006/0149415 A1* | 7/2006 | Richards | .................. | G07F 5/18 700/236 |
| 2007/0079012 A1* | 4/2007 | Walker | .................... | G06Q 20/32 709/249 |
| 2008/0208681 A1* | 8/2008 | Hammad | ............. | G06Q 20/045 705/13 |
| 2009/0281891 A1* | 11/2009 | Walker | ............... | G06Q 30/0283 705/400 |
| 2013/0185214 A1* | 7/2013 | Azen | .................. | G06Q 20/3272 705/76 |
| 2014/0025200 A1* | 1/2014 | Smith | ..................... | G07F 9/002 700/241 |
| 2014/0180473 A1* | 6/2014 | Otzen | ..................... | G07F 17/40 700/232 |
| 2015/0235202 A1 | 8/2015 | Zabala | | |
| 2016/0086418 A1* | 3/2016 | Smolen | .................. | G07F 9/001 700/232 |
| 2016/0105859 A1* | 4/2016 | Zhu | ........................ | H04W 76/10 370/350 |
| 2016/0225010 A1* | 8/2016 | Patel | .................. | G06Q 30/0267 |
| 2017/0040817 A1* | 2/2017 | Hu | .................... | H02J 7/007182 |

OTHER PUBLICATIONS

European Search Report issued in the corresponding European patent application No. 16151468.2, dated Apr. 14, 2016 (9 pages).
Mdb / Icp et al: Multi-Drop Bus / Internal Communication Protocol National Automatic Merchandising Association EVA European Vending Association EVMMA European Vending Machine Manufacturers Association; Feb. 1, 2011; XP055702096; https://www.ccv.er/wp-content/uploads/2018/05/mdb_interface_specification.pdf.
Communication Pursuant to Article 94(3) dated Jun. 12, 2020 as received in corresponding EP Patent Application No. 16151468.2.

* cited by examiner

SYSTEM FOR CASHLESS PAYMENT OF PRODUCTS OR SERVICES

TECHNICAL FIELD OF THE INVENTION

The present invention relates generally to a system for the cashless payment of products or services at automats, wherein automats are to be understood as vending machines as well as service machines, for example laundromats or drying automats, access control devices or identification devices.

BACKGROUND OF THE INVENTION

A previously known system is generally disclosed in U.S. Pat. No. 8,856,045, wherein an automat includes a payment unit, with said payment unit including at least one transmitting/receiving unit for short range communication, and a processing unit with a memory.

A user with a mobile telephone likewise including a transmitting/receiving device for short range communication as well as for long range communication; a processing unit; and a memory, can build up a short range communication using Bluetooth™ or the like with the payment unit, the communication typically being encoded.

The user starts a request regarding a product or a service of the automat, wherein an authorization request for an amount of money to be paid for the product or service is sent from the payment unit to the mobile telephone. The mobile telephone then transfers the authorization request for a sum of money to a server via-a long range communication, wherein the server exists at a bank or other financial service provider such as, for example, PayPal™ or the like.

The server, which has been provided with the respective credit data of the user of the mobile telephone, then sends a confirmation signal for the sum of money to the mobile telephone using the long range communication, and the mobile telephone-transfers the confirmation signal to the payment unit of the automat via short range communication. The product or the service is then issued by the automat after receiving the confirmation signal, and the procedure is completed.

With this system for cashless payment, however, a short range communication, as well as a long range communication, is necessary in order to carry out the sales procedure; specifically, on the one hand between the automat and the mobile telephone by way of the short range connection, as well as between the mobile telephone and the bank or credit institute. Therefore, the cashless payment cannot be carried out if a long range communication is not possible at the location of the automat.

Thus, if the automats are designed as, for example, drying automats or laundromats, and since such are often located in remote or relatively inaccessible areas such as cellars or the like, there will often be no internet access to use as a long range communication possibility.

OBJECTS OF THE INVENTION

It is therefore an object of the present invention to provide a system for the cashless payment or ordering of products or services whilst using a mobile telephone, wherein a long range communication does not necessarily have to be created simultaneously with the sales procedure.

Another object lies in transferring information concerning the procedure of the issuing of the products or services by the automat, but also concerning the automat itself, to a remote centre that stores the information concerning the automat and products and services, wherein for example the automat operator can likewise call up the information via a long range connection.

It is yet another-object to improve the management of services offered by one or more service machines or automats, in particular the time management of offered services.

DETAILED DESCRIPTION OF SEVERAL EXAMPLE EMBODIMENTS

In one example embodiment, a system for the cashless payment of products or services is provided, said system comprising: a payment unit disposed in at least one automat or machine comprising at least one transmitting/receiving unit for short range communication; a processing unit and a memory; and at least one mobile device or mobile telephone comprising a transmitting/receiving device for short range communication as well as for long range communication; a processing unit; and a memory.

In a more specific though non-limiting embodiment the transmitting/receiving unit of the automat/machine for short range communication is prepared for communication with and connected to a respective short range communication device in the mobile telephone, and the same or another short range communication device of the automat/machine is prepared for communication with and connected to respective short range communication devices of one or more other automats/machines.

In a further embodiment a credit given to the operator of one or more automats is stored in the memory of the mobile device/telephone. After the selection of a product or a-service, the payment unit is configured to transfer an amount which is stored in the memory of the payment unit and pays for the selected product or the service via the short range communication to the mobile device/telephone, and the processing unit of the mobile device/telephone is designed to reduce the credit stored in the memory of the mobile device/telephone by the amount, and the transmitting/receiving device sends a receipt-signal concerning the reduction of the amount to the payment unit, said payment unit thereupon enabling the release of the selected product or the service.

Through the short range communication between the automats/machines they can communicate about the availability of services or goods, and a service or product can be offered by a second machine even if it is not available from a first machine.

For present purposes, the expression "mobile phone" or "mobile telephone" includes but is not limited to all mobile devices that offer the same long range and short range communication possibilities, such as tablets, handheld communication and computing devices, such as smart phones, and/or other devices.

In another embodiment, the system also comprises a plurality of automats with a respective payment unit, wherein the plurality of automats in each case via a short range connection exchange data on their condition and on issued products and services and this data is intermediately stored in the respective memories of the payment units. In a still further embodiment, said information, concerning all automats, is transferred to the server via at least one mobile telephone of the plurality of mobile telephones or by several mobile telephones, optionally in a time-staggered manner.

In other embodiments the corresponding signal that acknowledges receipt of the data received from the server is transferred via one or more mobile telephones of the plurality of mobile telephones to the payment units, which exchange the information amongst one another via the short range communication, by which means it can be ensured that data and information can be exchanged between the payment units and the server and between the server and the payment units via the mobile telephones. The data in the mobile telephone can then be deleted as soon as the receipt acknowledgement signal has been transferred from the respective mobile telephone to at least one payment unit, and the data can be deleted from the payment units in the same manner after receiving the receipt acknowledgement signal.

In such manner, it is not necessary to provide a long range connection for a communication in a direct manner, but rather a credit given to the operator of the automat which was deposited by the user beforehand can be stored in the mobile telephone. In alternative embodiments, several credits for different automat operators may be deposited.

In further embodiments the selection of the product or the service can be carried out directly at the automat, but it is also possible to make the selection at the mobile telephone itself via a suitable dialogue with the payment unit. The course of the procedure for the acquisition of the product or service can be stored in a suitable program loaded onto the mobile telephone as an application, wherein such applications is managed by a central location and can be downloaded from this location.

In further embodiments still, the processing unit of the mobile-telephone can check as to whether the credit for an amount is sufficient or not, after the transfer of the amount for the selected product or service by the payment unit to the mobile telephone, and if the credit is sufficient then the credit is reduced by the amount. If it is not sufficient, a notification concerning the necessity of increasing the credit can be displayed on the mobile telephone, and/or the transmitting/receiving device of the mobile telephone, via the long range communication or the short range communication, can create a connection to a credit station or payment station, via which the credit for the operator of the automat is increased by an increase amount and is stored in the memory of the mobile telephone as an increased credit. The increase of the credit can be carried out by way of the credit information of the user which is stored in the memory of the mobile telephone or which can be inputted by the user, wherein the credit information can be sent from the transmitting/receiving device of the mobile telephone via the long range communication to the credit station, and a confirmation signal concerning the crediting of the increase amount for the operator of the automat can be received from this credit station, and the increased credit can be accordingly stored in the memory of the mobile telephone.

In other embodiments the user can interrupt the sales procedure on short notice and make their way to a location with a long range connection if no long range connection can be created, and at the new location can charge the credit and subsequently continue with the sales procedure. However, it is also possible at the installation location of the automat, particularly if a plurality of automats of an operator are present, such as in a laundrette for example, to pay an amount of money via a payment station which is set up there by the operator. By way of the transmitting/receiving device of the mobile telephone, a confirmation signal concerning the crediting of the increase amount to the operator of the automat can be received via the short range communication with the payment station after the payment of the increase amount, and the increased credit can be stored in the memory of the mobile telephone.

In further embodiments the payment unit of the at least one automat can be configured to store data on the condition of the at least one automat and on issued products or services in its memory, wherein this data is transmitted to the at least one mobile telephone via the short range communication. Thereby, the data on the condition of the at least one automat, for example a washing machine, can be detected by sensors which are arranged on or in the automat, and be transmitted to the payment unit by wire or in a wireless manner.

In other embodiments the system comprises a server, which is disposed, for example, at or near a neutral location, i.e., a location not provided by the operator of the automats, wherein the server is configured to receive, from the at least one mobile telephone via a long range communication, the data on the condition of the at least one automat and on the issued products or services long range which are transmitted between the payment unit and the mobile telephone during the short range communication.

In further embodiments still, the memory of the at least one mobile telephone intermediately stores the data on the condition of the at least one automat and on the issued products or services, and the transmitting/receiving device of the mobile telephone can be configured to send the intermediately stored data to the server as soon as a long range communication can be established, wherein the server is configured, after receiving the data, to send a receipt acknowledgement signal to the mobile telephone, said signal being intermediately stored in the memory of the mobile telephone.

It is possible to securely transmit data concerning the automat to the server by way of this type of communication, wherein the long range communication between the mobile telephone and the server can be carried out in a temporally staggered manner with respect to the actual sales procedure, specifically when a long range connection can be created between the mobile telephone and the server. This means that the mobile telephone is merely a type of "messenger" which transfers the data information further from the payment unit to the server.

I various embodiments the transmitting/receiving device of the mobile telephone can send the intermediately stored receipt signal concerning the transfer of the data on the condition of the automat and on the issued products or services to the payment unit of the automat as soon as a short range communication can be established between the payment unit and the mobile telephone. This means that transmission of the receipt acknowledgement signal from the mobile telephone to the payment unit of the automat is independent of the actual sales procedure, and can be carried out when a short range communication can be established or is established between the mobile telephone and the automat. This can be at a much later stage, specifically when the user of the mobile telephone again wishes to start a sales procedure with the automat. The receipt acknowledgement message which is intermediately stored in the mobile telephone is deleted from the memory of the mobile telephone after having been transferred to the payment unit. A deletion of the information can also be carried out after a longer, predefined time period, since the mobile telephone does not necessarily pass the automat within this time period.

In other embodiments the system comprises a plurality of mobile telephones, wherein the respective mobile telephone of the plurality of mobile telephones, with a short range communication between the payment unit and the respective mobile telephone, receives data on the condition of the at least one automat and on issued products or services, said data being stored in the memory of the payment unit of the automat, and intermediately stores it, and wherein the server is configured, via a long range communication, to receive the data on the condition of the at least one automat and on the issued products and services, said-data being sent by the respective mobile telephones, from the respective mobile telephone of the plurality of mobile telephones, as soon as the long range communication can be established. The server is moreover configured, after receiving the data, to send a receipt acknowledgement signal to the plurality of mobile telephones, as soon as a long range communication is established between a respective one of the plurality of mobile telephones, and this signal is intermediately stored in the memory of the respective mobile telephone.

With this system, it is ensured that the data is transmitted from the respective payment unit to the server, the plurality of mobile telephones serving as "messengers" in this case. The probability of the server containing the information is greatly increased, which is to say lies at 100%, since all mobile telephones in each case store a set or subset of data on the condition of the at least one automat and on the issued products and services and can transfer this data when a long range communication is possible.

In other embodiments the data of the server can be called up by the operator of the automats via a long range communication, for example the internet. The data is encoded and individually authorised with the complete communication between the mobile telephone and the payment unit of the automat and between the mobile telephone and the server.

Another aspect relates to a system for the cashless payment of products or services, comprising: a payment unit which is arranged in at least one automat or machine and which comprises at least one transmitting/receiving unit for short range communication, a processing unit and a memory, wherein the automat or machine is connected to one or more other automats or machines via short range communication, at least one mobile device or mobile telephone which comprises a transmitting/receiving device for short range communication as well as for long range communication, a processing unit and a memory, wherein a credit given to the operator of the automat is stored in the memory of the mobile device/telephone and wherein the payment unit is configured to send an amount which is stored in the memory of the payment unit and pays for the selected product or the service via the short range communication to the mobile device/telephone after the selection of at least one product or at least one service, and the processing unit of the mobile device/telephone is designed to reduce the credit stored in the memory of the mobile device/telephone by the amount, and the transmitting/receiving device sends a receipt signal for the reduction of the amount to the payment unit, said payment unit thereupon enabling the release of the selected product or the service, and wherein the automat or machine provides a connection for a charging voltage to which the mobile phone is connectable in order to enable the short range communication between the automat or machine and the mobile device/phone in case the battery of the mobile device/phone is not charged.

Through the connection for a charging voltage, the mobile device may be charged with electricity in order to fill an accumulator in case the accumulator is empty. This way, it can be guaranteed that the mobile device is always able to communicate with the automat(s) or machine(s). The connection may be a simple socket and plug connection, an USB socket or the like with support voltage provision or an inductive charging station.

For present purposes, when it is stated that an automat or machine is connected to one or more other automats or machines via short range communication, this may mean that the one or more other automats or machines have the same structure as the automat or machine that is mentioned first. It may, however also mean that the one or more other automats or machines have a different structure than the automat or machine that is mentioned first. The connection between the automat or machine mentioned first and the other automats or machines may for example be a Bluetooth™ connection, a WiFi or WLAN connection, an infrared connection, an ultrasound connection or any other kind of a wireless connection.

Another aspect relates to a system for the management of products or services, comprising: a payment unit which is arranged in at least one automat or machine and which comprises at least one transmitting/receiving unit for short range communication, a processing unit and a memory, wherein the automat or machine is connected to one or more other automats or machines via short range communication, at least one mobile device which comprises a transmitting/receiving device for short range communication as well as for long range communication, a processing unit and a memory, wherein a credit for the operator of the automat is stored in the memory of the mobile device and wherein, after the selection of at least one product or at least one service, the credit for the operator of the automat in the memory of the mobile device is reduced and a confirmation about the reduction of the credit is sent to the automat or machine.

Another aspect relates to a system according to the aspect mentioned above wherein the automat or machine provides a connection for a charging voltage to which the mobile device is connectable in order to enable the short range communication between the automat or machine and the mobile phone in case the battery of the mobile phone is not charged. The connection for a charging voltage to which the mobile device is connectable may be implemented as described above.

Yet another aspect relates to a system according to one of the aspects mentioned above, wherein the system moreover comprises a server and a plurality of automats with payment units, wherein the transmitting/receiving units of the respective payment unit are configured to send data on the condition of the respective automat amongst one another via a short range communication and to store this data in their respective memories, wherein the data is transmitted to the at least one mobile device/telephone during the short range communication of one of the payment units with this mobile device/telephone and is intermediately stored in its memory, wherein the server is configured to receive the data on the condition of the plurality of automats and on the selected product or service from the at least one mobile device/telephone via a long range communication, said data being transferred between the payment unit and the mobile device/telephone with the short range communication. The data on the condition of the automats may be data about the availability of the automat, an amount of energy stored in a storage of the automat, a number of events of a certain kind being registered by the automat or one or more values that have been measured by the automat or any other value that describes a property of the automat or of its environment.

Another aspect relates to a system for the management of products or services, comprising: a unit for the administration of access rights or rights to receive a product or service which is arranged in at least one automat or machine and which comprises at least one transmitting/receiving unit for short range communication, a processing unit and a memory, wherein the automat or machine is connected to one or more other automats or machines via short range communication, at least one mobile device which comprises a transmitting/receiving device for short range communication as well as for long range communication, a processing unit and a memory, wherein an access right or right to receive a product or service with regard to the automat or machine or one of the automats or machines is stored in the memory of the mobile device and wherein upon request of the automat/device, the mobile device sends a confirmation of the access right or right to receive a product or service to the automat/machine.

In this case, the system may be used for example for the control of access of persons to a room, an area or a building. It may also be used to control whether a certain person that is a registered user of the mobile device is entitled to receive a certain product or service. The rights of the person may be stored on the mobile device and may comprise rights that are defined by the account itself, such as the age of a child or an adult, or the rights may be defined by the content of the account, such as an amount of money or credit that is available on the account. For example, the mobile device may serve as a device to borrow books or video in a store.

A still further aspect relates to a system for the management of products or services according to one of the preceding aspects wherein, after the selection of either a product or a service, the receipt of the product or service is stored in the memory of the mobile device and a confirmation about the storage or of a reduction of a credit is sent to the automat or machine.

A further aspect relates to a system for the management of products or services according to one of the preceding aspects wherein, after the selection of an access right or another service, the receipt of the grant of the access right or the delivery of the service is stored in one or more of the automats/machines and/or in the mobile device.

Another aspect relates to a system for the management of products or services according to one of the preceding aspects wherein, after the selection and grant of an access right, a further access requested by the same mobile device is denied by all automats or machines for a fixed time period after the grant of an access right. Thereby, it can be prevented that a mobile device is used, for example, to get access to a building or area for two different individuals if the mobile device is only provided to identify one individual and to enable this individual to get access to the building or area. If a person tries to use the mobile device for a second person to get access to the same building or area within a certain period of time, access is denied to the second person by the system. For this purpose, it is a great advantage if the automats or machines that execute the access control are enabled to communicate with each other by a short range communication. The mobile device may be used to administrate the access rights of individuals in a central data base which is connected to the mobile device by a long range communication, for example a cell phone communication.

Yet another aspect relates to a system for the management of products or services according to one of the preceding aspects wherein, after the selection of an access right the automat/machine starts an inquiry among the other automats/machines as to whether an access right has already been claimed by the same mobile device or starts an inquiry as to whether an access right has already been claimed by the same mobile device and has been granted within a certain period of time.

Another aspect relates to a system according to one of the preceding aspects wherein the automat or machine provides a connection for a charging voltage to which the mobile device is connectable in order to enable the short range communication between the automat or machine and the mobile phone in case the battery of the mobile phone is not charged.

A still further aspect relates to a system according to one of the preceding aspects which moreover comprises a server and a plurality of automats with units for the administration of access rights or rights to receive a product or service, wherein the transmitting/receiving units of the respective unit for the administration of access rights or rights to receive a product or service are configured to send data on the condition of the respective automat amongst one another via a short range communication and to store this data in their respective memories, wherein the data is transmitted to the at least one mobile device/telephone via the short range communication of one of the units for the administration of access rights or rights to receive a product or service with this mobile device/telephone and is intermediately stored in its memory, wherein the server is configured to receive the data on the condition of the plurality of automats and on the selected product or service from the at least one mobile device/telephone via a long range communication, said data being transferred between the unit for the administration of access rights or rights to receive a product or service and the mobile device/telephone with the short range communication.

This structure for example enables the server to be informed about the status of the units, automats or machines at any time. Maintenance of the units, automats or machines can be easily organized and controlled centrally. Also, if one of the units, automats and machines is out of order, the service may easily be re-organized by deviating the user to one of the other units, automats of machines. The same holds if for example one of the units, automats or machines is unable to offer certain products or services. The units, automats or machines may communicate so that each of the units, automats or machines has information available about the choice of products, functions and services that is available from other units, automats and machines. The server receives this information through the mobile device and may also manage the products and/or services on offer by different units, automats and machines. The server may also decide to send a maintenance technician or to organize a refill of products.

Another aspect relates to a system for the management of products or services, comprising: a unit for payment or for the management of rights to receive a product or service, which unit is arranged in at least one automat or machine and which comprises at least one transmitting/receiving unit for short range communication, a processing unit and a memory, wherein the automat or machine is connected to one or more other automats or machines via short range communication, at least one mobile device which comprises a transmitting/receiving device for short range communication, a processing unit and a memory, wherein a credit given to the operator of the automat or a right to receive a product or service is stored in the memory of the mobile device and wherein, after the selection of at least one product or at least one service, the credit for the operator of the automat in the memory of the mobile device is reduced and/or information about receipt of a product or service is stored, wherein upon request, through the short range communication, the automat/machine calculates and makes available the waiting time until the requested product or service is available at the same automat or machine.

This feature may be important, for example, in a laundry where automats offer services that require a certain time. This leads to waiting periods because an automat/a washing machine is sometimes busy and not available for a new customer who wants to access and use the washing machine and control it with his mobile device, which may be, e.g., a mobile phone. The automat/washing machine may upon request offer a service after having finished the current washing process and may be able to inform the potential user about the waiting time. At the same time, the automat may communicate with other automats/washing machines in order to find out whether another washing machine in the same laundry is available at once or in the short term.

The system can also determine which of the automats is the next available. This may then be communicated via short range communication to the mobile device.

Accordingly, another aspect relates to a system according to one of the preceding aspects, wherein the automat or machine finds out at what time the next automat or machine is available for the required service or product.

Yet another aspect relates to a system according to one of the preceding aspects, wherein the automat or machine or the mobile device registers a reservation for one of the automats or machines, e.g., washing machines, that is available for the required product or service in the future, preferably for the automat or machine that is the first one to be available for the required product or service.

Another aspect relates to a system for the management of products or services or data, comprising: a unit for the administration of data, preferably of data that serve for individualization and/or identification of an automat or machine by the system and/or rights to receive a product or service, which is arranged in at least one automat or machine and which comprises at least one transmitting/receiving unit for short range communication, a processing unit and a memory, wherein the automat or machine is connected to one or more other automats or machines via short range communication, at least one mobile device which comprises a transmitting/receiving device for short range communication as well as for long range communication, a processing unit and a memory, wherein the mobile device receives the request of a right or product or service via short range communication from one of the automats or machines and wherein the mobile device either makes a selection of products and/or services that are offered or shows products and/or services that have been requested on a display and wherein an input device is provided on the mobile device that allows to confirm that a product and/or service has been given or granted to an individual person upon request of an individual automat or machine.

For example, each of the automats or machines in a hospital may serve to identify one patient or in a hotel may serve to identify one guest. The patient or guest has the necessity to receive certain drugs or treatments (if the person is a patient) or certain services like meals, drinks or access to certain areas (if the person is a guest in a hotel). A service person, e.g., a nurse, a doctor or a hotel employee, may use the mobile device in order to distribute products and/or services to the correct persons who are entitled or obliged to receive them. The delivery of the products or services may be confirmed through an input interface of the mobile device. The mobile device may send information about delivery of products or services to a server that keeps track of the stock of medical drugs or other goods and that also keeps track of the services and products that an individual person has received. Thereby, an overdosing of drugs or a receipt of therapies that should not be combined may be noticed by the server. If the information about the request to get certain products or services is shared among the automats or machines by a short range communication, the delivery of products or services, e.g., the delivery of drugs to individual patients in a hospital, may be organized in an efficient way. Each automat or machine may also confirm the delivery of a product, e.g., a drug, and send the confirmation in an encrypted form to the mobile device so that the delivery of drugs to each patient can be proven afterwards.

Another aspect relates to a system for the management of products or services, comprising: one or more automats or machines, each of the automats or machines having a unit for the administration of data, preferably of data that serve for individualization and/or identification of the automat or machine by the system, and wherein the unit comprises at least one transmitting/receiving unit for short range communication, a processing unit and a memory, wherein the automat or machine is connected to one or more other automats or machines via short range communication, at least one mobile device which comprises a transmitting/receiving device for short range communication as well as for long range communication, a processing unit and a memory, and wherein the mobile device provides a time base and sends time stamp data to one or more of the automats or machines via short range communication and wherein the time stamp is combined by the at least one of the automats or machines with data that permit the identification of the respective automat or machine, and wherein the combined data is encrypted by the automat or machine and sent to the mobile device via short range communication.

Such systems will admit to registration of the time at which the mobile device has exchanged data with an individual unit, automat or machine. Thus, it may, e.g., be proven afterwards at what time a person holding the mobile device has been near a particular unit, automat or machine and, for example, a guard that has to pass by a number of units, automats or machines may prove that he has passed by a certain one of the units, automats or machines at a certain time. Also, in the case of a system that administrates the delivery of medical drugs to patients, it may be confirmed that a certain drug has been delivered to a certain patient at a certain time.

A still further aspect relates to a system according to one of the preceding aspects wherein the automat or machine has at least one sensor or counter that acquires data and wherein the acquired data are combined with the time stamp data and the data that permit the identification of the respective automat or machine, and wherein the combined data is encrypted by the automat or machine and sent to the mobile device via short range communication. In this way, for example each of the units, automats or machines may have one or more sensors that measure values of parameters.

These values may be sent to the mobile device together with a time stamp. For example, in a hospital a unit may carry the identification of a patient. If a service person passes by, the unit may require a drug for the patient, the receipt of the drug may be confirmed-together with a time stamp, and at the same time a parameter value pertaining to the patient may be sent and stored in the mobile device and/or sent to a server by the mobile device. Such a parameter may, e.g., be the body temperature of the patient, the patient's pulse, blood pressure, blood sugar level or any other level of a component or ingredient of a body liquid.

Figure 1:
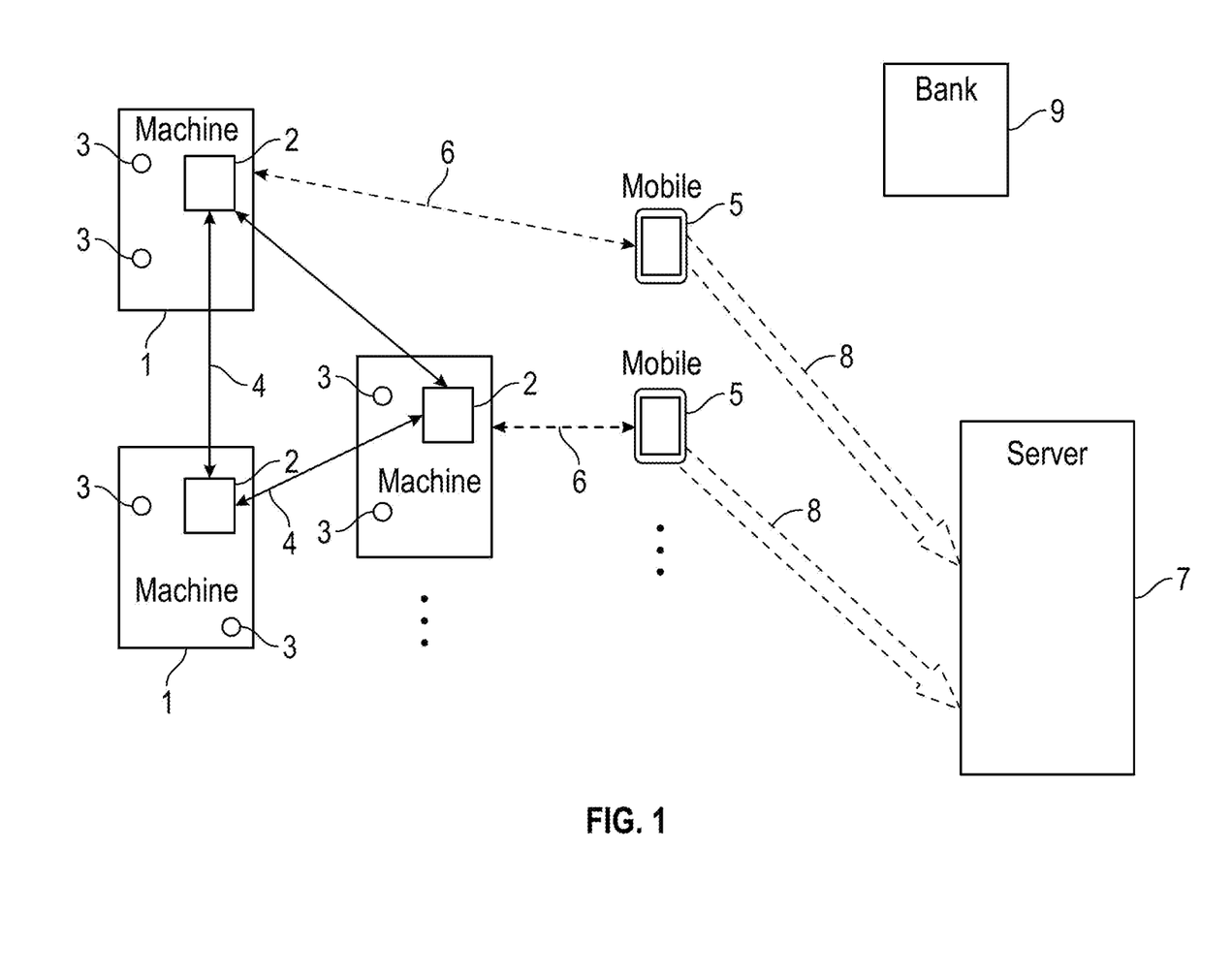
FIG. 1 shows one example embodiment of a system described herein.

With reference now to the attendant Figures, the system represented in FIG. 1 comprises, for example, a plurality of automats 1, of which only three are represented in the figure; however, a multitude of automats can be provided. The automats for example are designed as washing machines (laundromats) in a laundrette, and these provide various washing procedures and compute the payment amounts which are charged for these washing services. The automats can also be vending machines (sales automats) which contain different products at different prices. The automats 1 each comprise payment units 2 which comprise at least one processing unit, e.g. a microcontroller, a memory and a transmitting/receiving unit for a short range communication. The short range communications for example is based on a Bluetooth™ module; other technologies are however also possible. The automats 1 can comprise sensors 3 which scan or sense the parameters concerning the condition of the respective automat 1, wherein the condition is based on parameters of the functioning manner of the automat. The individual automats 1 are connected to one another via a short range communication 4, and in each case transmit data which relates to the condition of the automat and the products or services which are provided by the automat. This information in each case is stored in all memories of the payment units of all automats. The memories of the payment units moreover store the prices for the products and services which an automat respectively contains or provides.

Two mobile telephones 5 are represented in the figure, and these two mobile telephones are only represented by way of example; it may be envisaged that only one mobile telephone is provided. In the embodiment example however, the system is described with a plurality of mobile telephones and these comprise at least one processing unit and a memory, as well as a display and a transmitting/receiving device for short range communication and long range communication. A program or application is stored in the mobile telephone 5, and this program controls the course of the communication between the constituents of the system. Data relating to the amount of one or more credits given to the operator of the automat and, as the case may be, other operators of other automats is stored in the memory of the mobile telephone 5, the credit having been transferred or credited beforehand from the user of the mobile telephone to the operator, with the proviso that the credit is linked to the availment of products or services which the automat 1 provides. A short range communication 6, for example Bluetooth connection, can be established via the transmitting/receiving device of the mobile telephone 5 and the transmitting/receiving unit of the payment unit 2 of an automat 1.

A further constituent of the system is a server 7, in which data on the condition of the automats 1 as well as on the products or services of the automats is stored. Of course, the server 7 also comprises all constituents which are immanent to a server, such as processing unit, memory, and communication units, which are not explained in detail here. The mobile telephones 5 can implement a long range communication with the server, for example a communication via an internet connection.

The communication between the mobile telephone 5 and the payment unit 2 of the automat is described hereinafter. At the beginning of the short-range communication 4 between the transmitting/receiving device of the mobile telephone 5 and the transmitting/receiving unit of the payment unit 2, the mobile telephone communicates 5 transmits the desire to obtain one or more products or one or more services. During this process the payment unit or the transmitting/receiving unit can also inform the mobile telephone 5 of a number of possible products and services together with their prices, and the user of the mobile telephone on their mobile telephone selects the product they wish to have. The selection together with the prices is sent to the automats. The respective cost of the product or service is transferred from the payment unit 2 to the mobile telephone 5, after the user has carried out their selection of the product or the service on their telephone or at the automat itself. In the mobile telephone 5, it is firstly examined whether the credit stored in the memory of the mobile telephone 5 or the amount which is stored there is sufficient for the sales procedure. If this amount is sufficient, then the credit is reduced by the amount to be paid, and a receipt signal for the reduction of the amount is sent to the payment unit 2 so that the selected product or the service can be released for issue.

If the credit stored on the telephone 5 is not sufficient, the user of the mobile telephone 5 long range can carry out a communication via a long range communication with a bank 9 or a financial service provider, where an amount indicated as a credit is credited to the operator of the automat; a confirmation signal including the payment sum is sent after this transaction from the financial service provider or the bank 9 to the mobile telephone 5, in whose memory the credit is then increased by the payment sum. The "prior" payment to the operator of the automat can be carried out in the usual manner by way of credit card, PayPal account or other direct debit authorization.

However, a payment station or charging station can also be provided in the direct proximity of the automats by the operator of these automats in the region of the automats 1. In this case, for example, one can pay in cash via the payment automat, and the credit on the mobile telephone 5 can be increased via a near-field communication between the payment automat, which is to say the payment station.

The communication between the payment unit 2 of the automat 1 and the mobile telephone 5 would typically be secured by way of an encoding method.

As is evident from the above description, the system does not manage any money, and the credit which is stored and managed on the mobile telephone 5 always corresponds to a credit which has been given to the operator of the automats 1 by the user of the mobile telephone 5.

The communication between the payment unit 2 of the automat 1 and the server 7 is described hereinafter. This communication does not take place in a direct manner, but only via mobile telephones 5 of users which transfer data and information in a capacity as so-called "messengers" or as a so-called "communication hub". As already specified, there is a short range communication between the payment units 2 amongst one another, and this communication takes place through a connection established at certain temporal intervals. During this communication, data concerning the condition of the automat 1, which is obtained for example via the sensors 3, is transmitted to each of the payment units 2, so that all data of the other automats is stored in the payment unit 2 or in its memory. This applies to the condition of the individual automats as well as to the information concerning the available and issued products or services. This information, stored in the memory of the respective payment unit 2, is transmitted to a mobile telephone 5, during a close-range communication 6 between one of the automats or payment units 2 and this mobile telephone 5. This means that all mobile telephones 5 which come into communication with one of the automats via the close-range communication 6 obtain the information concerning the condition, products and services of all automats. This information is stored in the respective memory of the mobile telephone 5. The information on the current sales process, which, may not yet have been transferred from the current payment unit 2 to the other payment units 2, is stored in the mobile telephone additionally to the first mentioned information. The information which is thus stored is transferred to the server via the long range communication 8, for example an internet communication, as soon as a long range communication can be established. This means that the data is not transferred to the server 7 simultaneously with or shortly after the sales procedure between the mobile telephone 5 and the automat 1, but can also be transferred in a time-staggered manner. If for example a long range communication is not possible in the proximity of the automat, then a communication with the server 7 is not carried out until, in this example, an internet connection is indeed available.

One may assume that all necessary data of the automats is collected in the server 7, since the data of the payment units 2 is transmitted to the server 7 at a time at which a long range communication is established from each mobile telephone 5 which was in communication with an automat 1 and stored this information in its memory long range. As soon as the server 7 receives data from one of the mobile telephones 5 via the long range communication 8, server 7 sends a receipt acknowledgement signal back to the respective mobile telephone 5, with said mobile telephone again storing this information in its memory. As soon as the mobile telephone 5 again comes into the proximity of an automat 1 and builds up a near-field communication 6, the receipt acknowledgement signal is transferred to the respective payment unit 2 which transfers the information of the receipt acknowledgement signal to the other payment units 2 via the close-range communication 4, somewhat staggered with regard to time. This transferred information is then deleted in the mobile telephone 5 as well as in the payment units 2. The information is deleted after a defined time period in the case that the mobile telephone 5 receiving the receipt acknowledgement signals no longer gets into the proximity of the automat.

The operator of the automat long range can call up the data concerning this automat from the server 7 via a long range communication after identification. Data concerning the operator of the automat is contained in the configuration of the payment unit, so that an assignment of the payment units to the operators is given, and this assignment reaches the server with the message from the "messenger" (e.g., mobile telephone 5).

Figure 2:
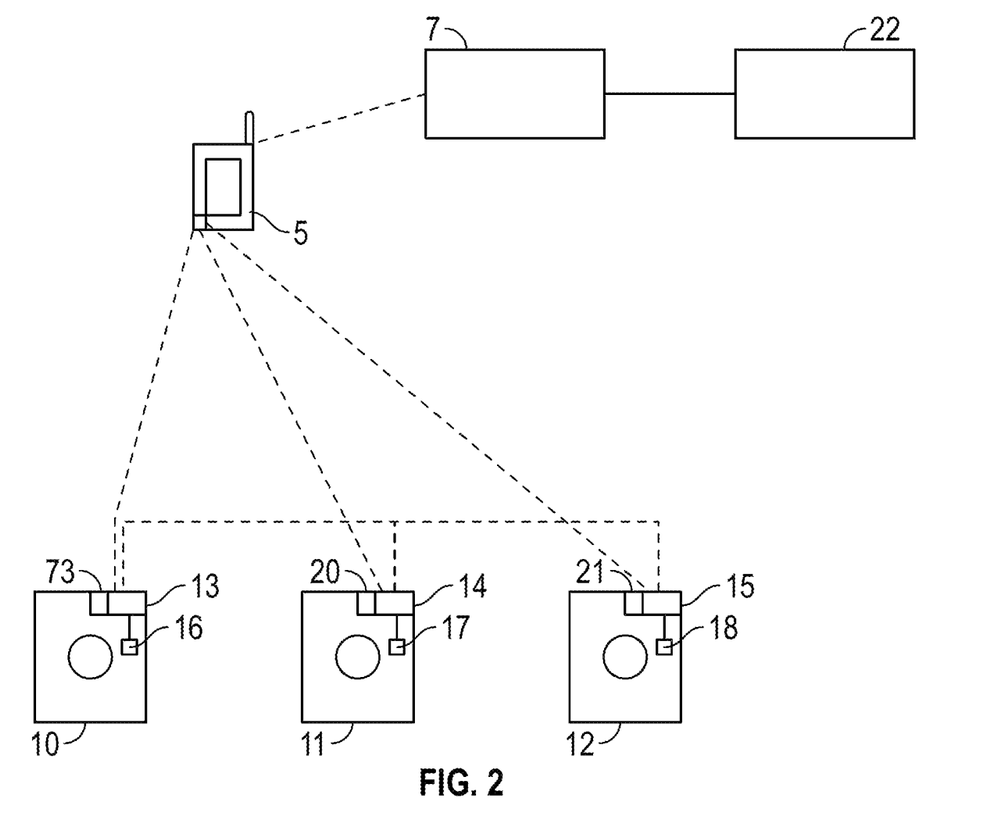
FIG. 2 shows a system with three washing machines that share time schedules and waiting times among themselves and with a mobile device.

FIG. 2 shows three automats in the form of washing machines 10, 11, 12 that are located, e.g., in a publicly accessible area and may be rented by users for private or commercial use. One or more or all of the washing machines each comprise one unit for payment or for the management of rights to receive a product or service, wherein the product may be a powder that is used as an ingredient for washing, and a service may be to use the washing machine for a certain time or a certain washing programme. Each unit is arranged in at least one machine and comprises at least one transmitting/receiving unit 13, 14, 15 for short range communication, a processing unit and a memory. The three units 13, 14, 15 communicate via a short range communication such as Bluetooth™ or WiFi/WLAN among themselves and with a mobile device 5 which comprises a transmitting/receiving device for short range communication, a processing unit and a memory. The mobile device 5 may or may not have a communication unit for long range communication (e.g., a cell phone communication) with a server 7. If the mobile device sends data about the machines 10, 11, 12 to the server 7, the data can be stored in a data base 22.

A credit given to the operator of the automats/laundry is stored in the memory of the mobile device 5 irrespective of the communication with the server 7. After the selection of at least one product or at least one service, the credit given to the operator of the automat in the memory of the mobile device is reduced and/or information about receipt of a product or service is stored.

When a user approaches a washing machine, he/she may send an inquiry by the short range communication to one of the machines or all machines asking if one of the machines is immediately available. Upon request, through the short range communication, at least one of the automats/machines calculates and sends information about the waiting time left until the requested washing machine or service is available at the same automat or machine or, if not, whether the service may be offered by a different machine immediately or later. For that purpose, the washing machines 10, 11, 12 have sensors 16, 17, 18 that may sense the progress of a-washing program or any other parameter, for example a technical problem of the machine or a necessity of maintenance.

Each of the machines 10, 11, 12 may as well have a unit 19, 20, 21 for the individual time base and time management. In this unit, the progress of the current washing service/program is accessible, as well as the duration of the booked program and potentially reservations of the machine by a user for a later time.

Upon request of the mobile device 5, the machines 10, 11, 12 communicate and find out which automat/machine will be the first to be available. This information is sent to the mobile device, which may show on a screen-either a complete schedule of the machines and/or the point in time when the next machine will be available, which machine that will be available first, and the expected waiting time. The user may have the opportunity to make a reservation for one of the machines.

Figure 3:
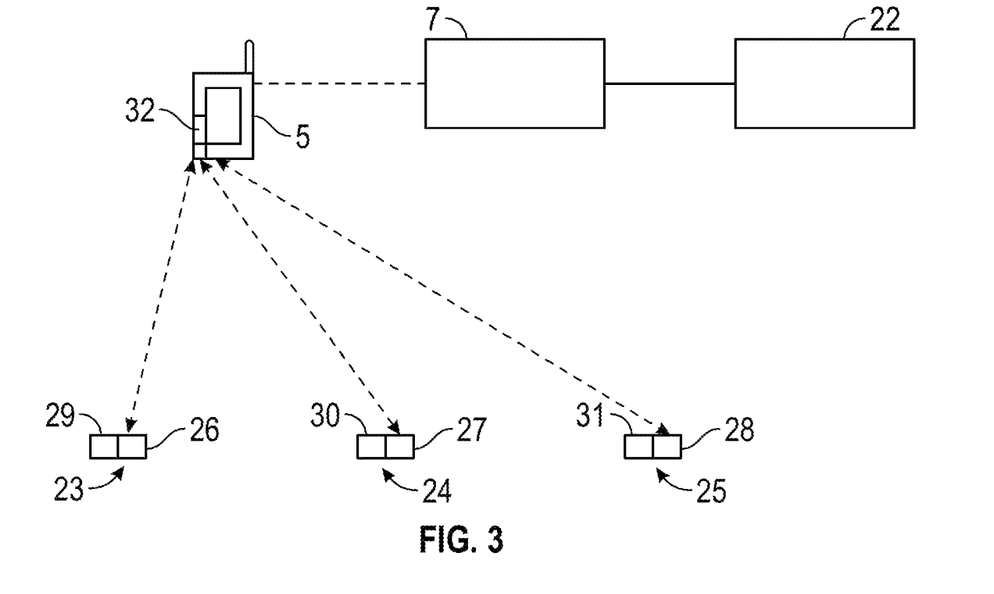
FIG. 3 shows automats that serve to identify items or places.

FIG. 3 shows a system wherein each of the automats/machines 23, 24, 25 has a unit with a communication unit 26, 27, 28 for short range communication and with an identification or authentication unit 29, 30, 31, wherein each of the identification or authentication units is combined with an encryption unit. When, for example, a guard passes by items, e.g. cars or buildings, to which the automats 23, 24, 25 are connected and that are marked by the automats, the mobile device 5 may send a time stamp that is taken from a time base. The time base may be a clock 32 that may be located in the mobile device 5 or in one of the automats 23, 24, 25 or in the server 7 or somewhere else outside the system. As the mobile device communicates with the automats by a short range communication exclusively, this communication is a proof that the mobile device (and hence, the guard) has passed by each of the automats. Each time when the time stamp is received by one of the automats is combined with its identification code and both together are encrypted and sent to the mobile device. The mobile device may send the encrypted data via a short range communication or a long range communication to the server 7, which may decrypt the data and store the proof that the items that are marked by the automats 23, 24, 25, have been visited by the guard.

Figure 4:
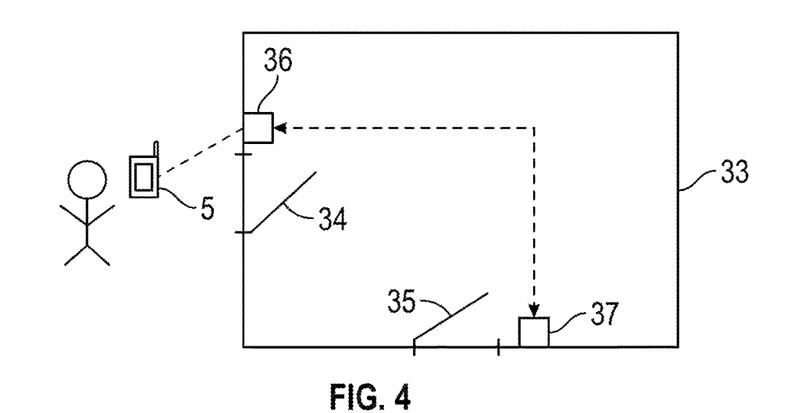
FIG. 4 shows an access control system with two automats.

FIG. 4 shows a room or a house 33 that has two doors 34, 35. Access through each of the doors 34, 35 is controlled by an automat 36, 37 that may keep the respective door 34, 35 shut or open it or enable opening. In another example the room may be a parking area and the doors are rather pivotable bars that permit or block access for cars.

If a person approaches one of the doors 34, 35, a message/inquiry may be sent by the mobile device 5 to one or more of the automats 36, 37. Either the mobile device 5 sends an encrypted signal containing the permission to get access to the room 33 that can be decrypted by the automats, or the mobile device sends information about the identification of the person carrying the mobile device. In this case, the automats 36, 37 comprise lists of identities of persons that have permission to get access to the room 33.

If the person carrying the mobile device 5 is entitled to enter the room, the nearest automat 36 may open the door 34. The checking process may provide that the automat checks at which time the person passed one of the automats the last time. If one of the doors has been passed in the same direction (from outside to inside) a short time ago, the automat may have the instruction to block the access until a certain period of time has passed. By this measure, a misuse of an identity with a mobile device by a person or a second person may be prevented.

For this purpose, it is important that the automats 36, 37 can communicate with each other in order to share the information about a recent access to the room 33 by a certain person. Therefore, a short range communication between the automats 36, 37 is provided, e.g., by Bluetooth™ or WiFi.

Figure 5:
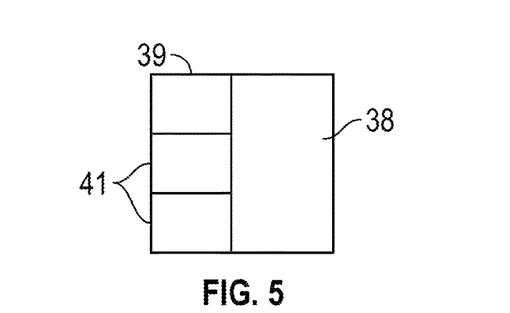
FIG. 5 shows a detail of an automat of FIG. 4.

FIG. 5 shows an internal structure of one of the automats 36, 37 with a control unit 38, a time base/clock, 39, a storage unit 40, where access times in connection with identities are stored, and a time schedule unit 41, where de-blocking times for the identities are stored. If a mobile device connects with an automat, the automat looks up in a list if the mobile device or identity of the holder of the mobile device is provided with access rights to the room 33. The automat also looks up if there is a waiting time for the mobile device or its holder until the end of a blocking period because the person has passed one of the automats only a short time ago. For this purpose, the automats 36, 37 are connected with each other by a short range communication and share the lists. If the approaching person has access rights and there is no blocking time, the nearest automat 36, 37 opens/unlocks the door 34, 35.

Figure 6:
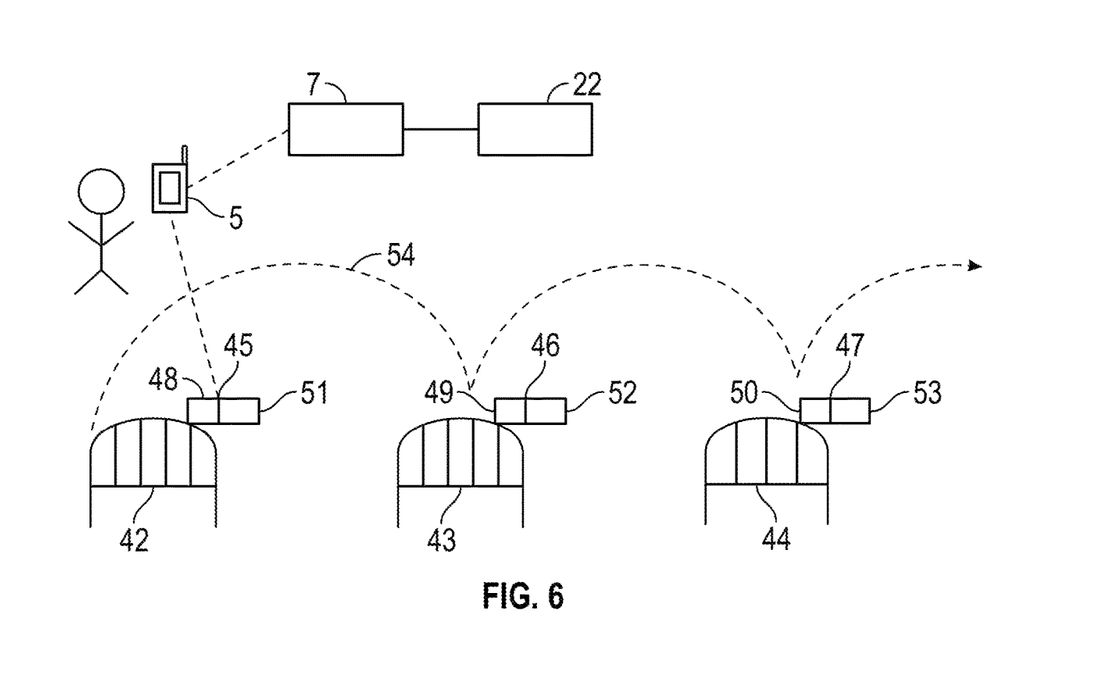
FIG. 6 illustrates a management system for the service of patients in a hospital.

FIG. 6 shows the application of a system in a hospital, where a number of beds 42, 43, 44 are marked with automats 45, 46, 47. Each of the automats 45, 46, 47 comprises a communication unit 48, 49, 50 for short range communication with a mobile device 5 (which may in this case be a tablet or handheld computer). The automats 45, 46, 47 may be or not be connected among themselves via a short range communication. Each of the automats 45, 46, 47 also has an identification unit 51, 52, 53 that is connected to a patient and defines the identity code of an individual patient. Information about the health state and/or diagnosis and/or medication plan of the patient may be stored in each respective automat 45, 46, 47 and/or in the mobile device 5 and/or on a server 7. The mobile device 5 communicates with the server 7 via a short range communication and/or a long range communication. This way, the mobile device can show during short range connection with an individual automat 45, 46, 47 which treatment or drugs the patient who is marked by the automat should receive. A person holding the mobile device, e.g. a doctor, may give the treatment or drug(s) to the patient, or the mobile device may send a signal to the automat about the entitlement to receive certain drugs and the automat may provide the drugs by opening/unlocking a door to a container near the bed of the patient. The person holding the mobile device passes by all marked beds/patients on his/her path 54 through the hospital.

The invention claimed is:

1. A system for the cashless payment of products or services, comprising:
   a server;
   a plurality of vending machines, each of vending machine comprising:
      at least one payment unit, each payment unit comprising at least one communication unit for short range communication, said communication unit comprising at least one transmitting unit and at least one receiving unit, and
      a processing unit and a memory, wherein each vending machine of the plurality of vending machines is connected to one or more other machines directly via short range communication;
   at least one mobile device, comprising a communication device for short range communication, a communication device for long range communication, and a processing unit and a memory,
   wherein a credit for an operator of said machines is stored in the memory of the mobile device, and wherein the payment unit is configured to send an amount which is stored in the memory of the payment unit and pays for a selected product or a service via the short range communication to the mobile device after the selection of at least one product or at least one service, and the processing unit of the mobile device performs the reduction of the credit stored in the memory of the mobile device by the amount, and the short range communication device of the mobile device sends a receipt signal for the reduction of the amount to the payment unit, said payment unit thereupon enabling the release of the selected product or the service;
   wherein the communication units of the respective payment units are configured to send data on the condition of the respective vending machines amongst one another via a short range communication and to store this data in their respective memories,
   wherein the data is transmitted to the at least one mobile device via the short range communication of one of the payment units with the mobile device and is intermediately stored in the mobile device memory,
   wherein the server is configured to receive the data on the condition of the plurality of vending machines and on the selected product or service, from the at least one mobile device via a long range communication, said data being transferred between the one of the payment units and the mobile device with the short range communication.

2. The system according to claim 1, wherein the processing unit of the mobile device examines whether the credit for the amount is sufficient or not, after the transfer of the amount for the selected product or service by the payment unit to the mobile device, and if the credit is sufficient then the credit is reduced by the amount, and if it is not sufficient, a notification for increasing the credit is displayed and/or the communication device of the mobile device via a long range communication or short range communication creates a connection to a credit station or payment station via which the credit given to the operator of the vending machines is increased by an increase amount and stored in the memory of the mobile device as an increased credit.

3. The system according to claim 2, wherein credit information of the user is stored in the memory of the mobile device, or credit information is inputted into an input unit of the mobile device, said credit information being sent from the communication device of the mobile device via the long range communication to the credit station, and a confirmation signal concerning the crediting of the increase amount given to the operator of the vending machines is received from this credit station, and the increased credit is stored in the memory of the mobile device.

4. The system according to claim 3, wherein the communication device of the mobile device, via the short range communication, receives a confirmation signal concerning the crediting of the increase amount for the operator of the vending machines from the payment station after the payment of the increase amount, and the increased credit can be stored in the memory of the mobile device.

5. The system according to claim 1, characterised in that a payment unit of the at least one vending machines is configured to store data on the condition of the at least one vending machines and on issued products or services, in its memory, wherein this data is transmitted to the at least one mobile device via the short range communication.

6. The system according to claim 5, further comprising a server which is configured to receive the data on the condition of the at least one vending machines and on the issued products or services from the at least one mobile device via a long range communication, said data being transmitted between the payment unit and the mobile device with the short range communication.

7. The system according to claim 6, wherein the memory of the at least one mobile devices intermediately stores data on the condition of the at least one automat and on the issued products or services, and the communication device of the mobile device is configured to send the intermediately stored data to the server as soon as a long range communication can be established, wherein the server is configured, after receiving the data, to send a receipt acknowledgement signal to the mobile device, said signal being intermediately stored in the memory of the mobile device.

8. The system according to claim 6, wherein the communication device of the mobile device sends the intermediately stored receipt acknowledgement signal concerning the transfer of the data on the condition of the vending machines and on the issued products or services to the payment unit of the vending machines as soon as a short range communication can be established between the payment unit and the mobile device.

9. The system according to claim 6, further comprising a plurality of mobile devices, wherein the server is configured, via a long range communication, to receive data on the condition of the at least one vending machines and on the issued products and services, from at least one of the plurality of mobile devices telephones, said data being transmitted between the payment unit and the respective one of the plurality of mobile devices during a short range communication, wherein the memories of the plurality of mobile devices intermediately store the data on the condition of the at least one vending machines and on the issued products or services, and the communication device of the respective mobile device is configured to send the intermediately stored data to a server as soon as a long range communication can be established, wherein the server is configured, after receiving the data, to send a receipt acknowledgement signal to the plurality of mobile devices as soon as a long range communication between a respective one of the plurality of mobile devices is established, wherein this signal is intermediately stored in the memory of the respective mobile device.

10. The system according to claim 7, wherein the plurality of vending machines in each case via a short range connection exchanges data on their condition and on issued products and services, and this data is intermediately stored in the respective memories of the payment units.

11. The system according to claim 10, wherein the communication device of the respective mobile device of a plurality of mobile devices sends the intermediately stored receipt acknowledgement signal concerning the transfer of the data on the condition of the vending machine or machines and on the issued products or services to the payment unit of a vending machine as soon as a short range communication is established between the payment unit and the mobile device.

12. The system according to claim 1, wherein the communication device of the mobile telephone is configured to send the intermediately stored data to the server as soon as a long range communication can be established, wherein the server is configured to send a receipt acknowledgement signal to the mobile device after receiving the data, the communication device of the at least one mobile devices sends the receipt acknowledgement signal to at least one payment unit as soon as a short range connection transferring the information to the other payment units can be established, and the data intermediately stored in the memory of the mobile device is deleted.

13. The system according to claim 1, wherein the payment unit of the at least one vending machine is designed as a coin tester for receiving coins and banknotes and comprises the communication unit for a short range communication.

14. The system according to claim 1, wherein the vending machine provides an electric connection for a charging voltage to which the mobile device is connectable in order to enable the short range communication between the vending machine and the mobile device in case the battery of the mobile device is not charged.

* * * * *